Jan. 16, 1940.  E. F. HUBACKER  2,187,033
ELECTRIC MOTOR
Filed Jan. 8, 1937  3 Sheets-Sheet 2
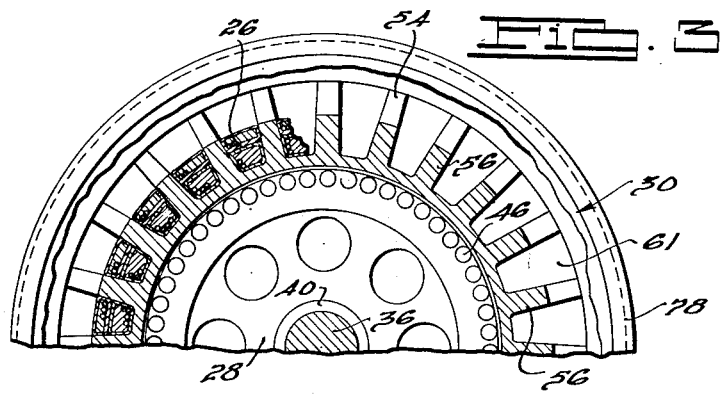
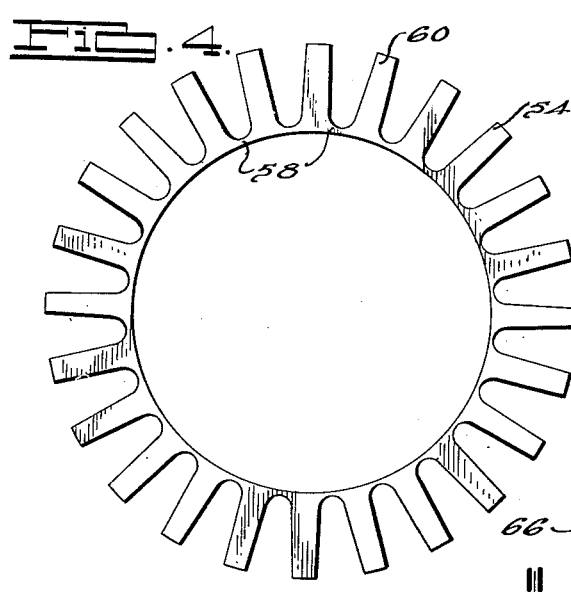
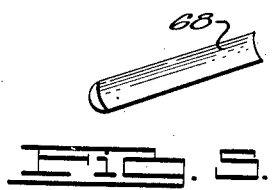
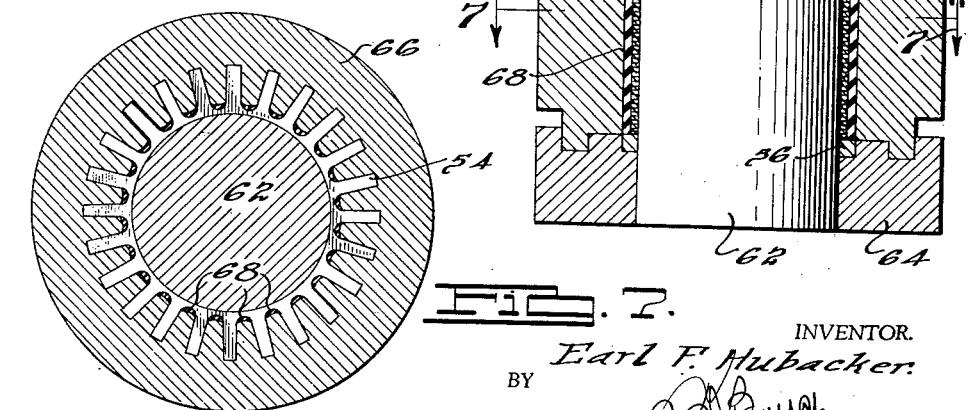
INVENTOR.
Earl F. Hubacker
BY
ATTORNEY.

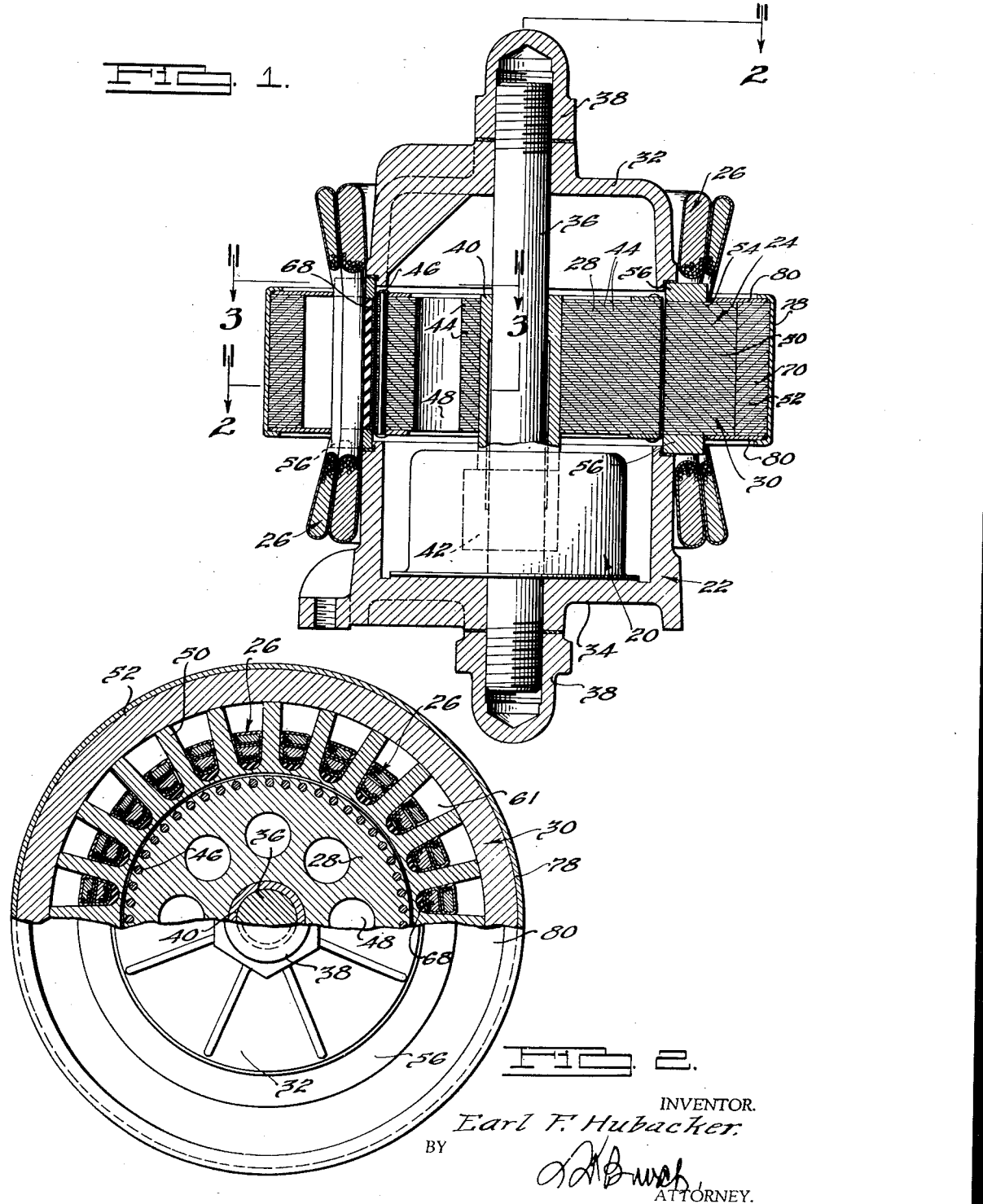

Jan. 16, 1940.  E. F. HUBACKER  2,187,033
ELECTRIC MOTOR
Filed Jan. 8, 1937   3 Sheets-Sheet 3
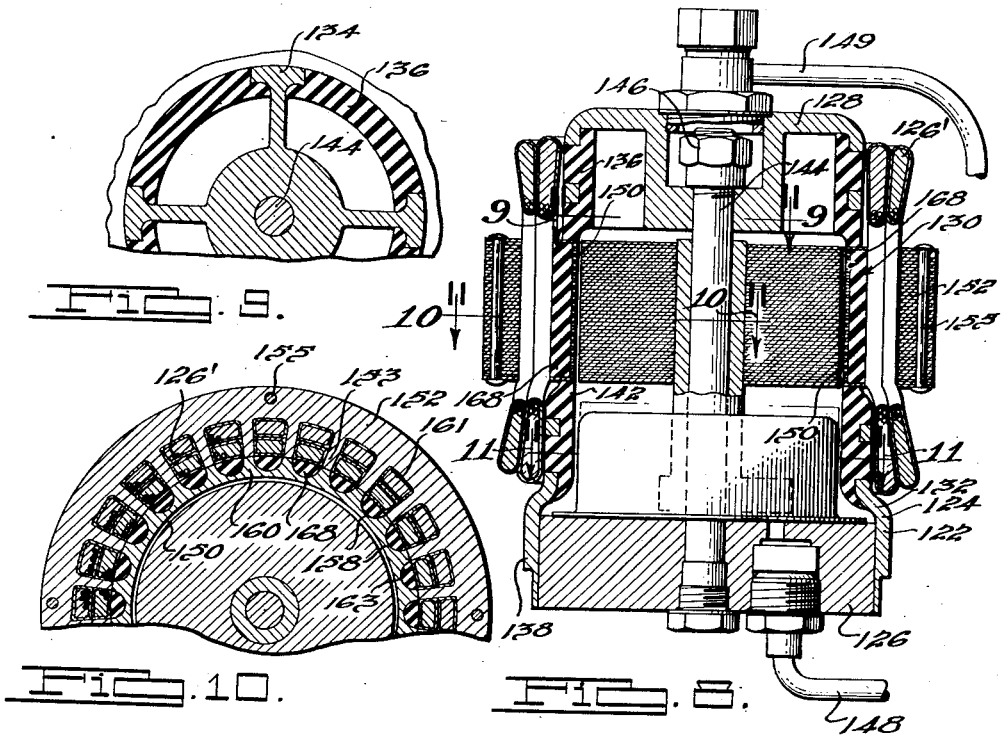
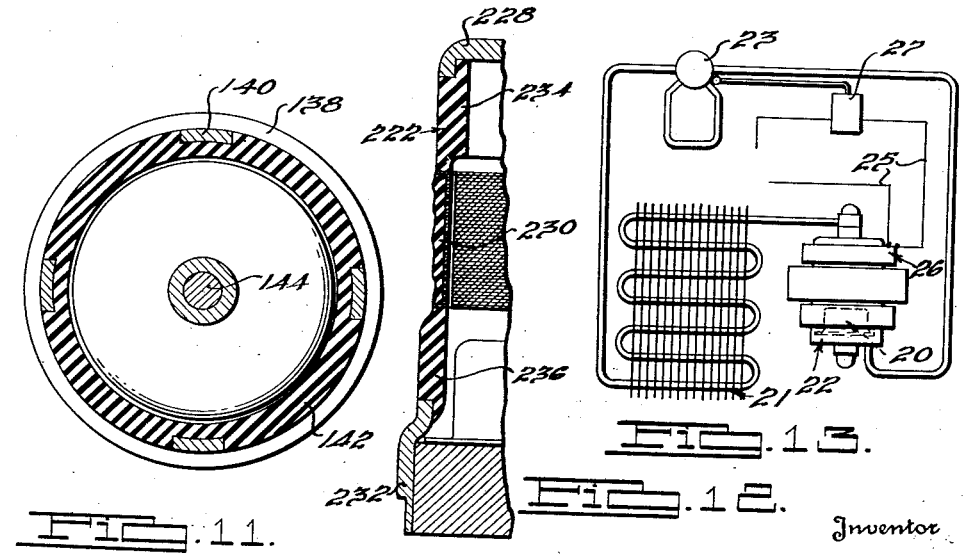
Inventor
Earl F. Hubacker.
By
Attorney Patented Jan. 16, 1940

2,187,033

UNITED STATES PATENT OFFICE 2,187,033

ELECTRIC MOTOR

Earl F. Hubacker, Highland Park, Mich., assignor to Borg-Warner Corporation, a corporation of Illinois Application January 8, 1937, Serial No. 119,567

11 Claims. (Cl. 172—36)

This invention relates to electric motors, and particularly to electric motors for use in refrigerating systems wherein the motor rotor is arranged within a sealed casing, with the motor windings arranged externally thereof.

In refrigerating systems utilizing a compressor or pump, and wherein the pump or compressor is driven by a motor through a seal, difficulty has been encountered in preventing loss of the refrigerant medium employed in the system through such seals. Heretofore various arrangements of "sealed units" have been suggested. In one type of "sealed unit" heretofore employed, an electric motor and a compressor or pump, have been enclosed in a gas-tight casing so that no seal was required. Some of the disadvantages of this type of construction are that the motor windings are exposed to the refrigerating medium within the casing and also that the electrical conduits have to be brought through the walls of a metallic casing in such a way as to be insulated therefrom and not to permit the escape of the refrigerating medium. Another type of sealed motor compressor construction has been suggested wherein a gas-tight casing is interposed between the stator and the rotor of the motor. A still further modification of a sealed motor compressor construction has been suggested wherein the stator laminations were formed as a part of a gas-tight casing enclosing the motor rotor and the compressor and with the motor windings arranged externally of the casing. While these latter two constructions did obviate certain disadvantages of the sealed motor construction unit wherein the windings were enclosed within the gas-tight casing, these latter two constructions did present other problems and difficulties, particularly in that the motor was inefficient on account of the large flux losses due, primarily, to the amount of metal or the distance between the motor windings and the motor rotor.

This invention contemplates the provision of a sealed casing having a motor rotor and a compressor arranged therein and with the motor windings arranged externally of the casing. More particularly the invention contemplates an improvement in sealed motor compressor units wherein the flux losses and consequent inefficiency of the constructions heretofore suggested are eliminated and this result is obtained in the present instance by means of an improved form and method of constructing and arranging the gas-tight casing and the motor windings.

A principal object of the invention therefore, is the provision of a sealed motor compressor unit wherein the motor windings are arranged on the outside of the unit and which unit is more efficient in operation than those heretofore known.

Another object of the invention is to provide a new and improved form of sealed motor compressor unit which is adapted to be economically manufactured, and which is so designed as to permit the manufacture and assembly thereof, in accordance with present day large scale methods of construction and assembly.

Another object of the invention is to provide an improved form of sealed motor compressor unit wherein a plastic or non-conducting material is employed as a part of the gas-tight casing which encloses the motor rotor and compressor.

Another object of the invention is to provide a sealed motor compressor unit wherein the motor windings are arranged externally thereof, with a gas-tight ring arranged between the motor windings and the motor rotor, which ring is so constructed and arranged as to form a part of the casing enclosing the compressor and the rotor and able to withstand the pressures prevailing within the casing, and which ring is designed so as to afford a minimum separation of the windings and the rotor so as to cut down the flux loss to a negligible quantity so that the motor is just as efficient as standard motors of the unsealed type now employed for driving the compressors of refrigerating systems.

Other objects and advantages of the invention will be apparent from a consideration of the following specification taken in conjunction with the accompanying drawings, of which there are three sheets, and wherein:

Fig. 1 is a vertical sectional view of a sealed motor compressor unit embodying my invention with the compressor portion thereof shown in elevation.

Fig. 2 is a view of the construction illustrated in Fig. 1 taken along the staggered line 2—2 thereof and showing a horizontal section of the motor compressor unit.

Fig. 3 is a horizontal view taken in the plane along the line 3—3 of Fig. 1 looking in the direction of the arrows.

Fig. 4 is a plan view of the spider laminations employed in the modification illustrated in Figs. 1, 2 and 3.

Fig. 5 is a perspective view of a plastic insert which is adapted to be arranged between the motor windings and the annular connecting portion of the spider.

Fig. 6 is a vertical sectional view of a mould illustrating a step in the method of manufacturing a stator ring.

Fig. 7 is a horizontal sectional view taken in a plane on the line 7—7 of Fig. 6.

Fig. 8 is a vertical sectional view illustrating a modified form of sealed motor-compressor construction.

Fig. 9 is a horizontal sectional view of the modified form illustrated in Fig. 8 and taken in a plane on the line 9—9 thereof.

Fig. 10 is a horizontal sectional view illustrated in Fig. 8 and taken in the plane along the line 10—10 thereof.

Fig. 11 is another horizontal sectional view of the modification illustrated in Fig. 8 and taken on the line 11—11 thereof.

Fig. 12 is a fragmentary view illustrating in vertical section a modification of the construction illustrated in Fig. 8; and Fig. 13 is a diagrammatic illustration of a refrigerating system embodying my invention.

In Fig. 1 of the drawings there is illustrated in vertical section a sealed motor compressor unit which includes a compressor or pump indicated generally at 20. This compressor may comprise a part of a refrigerating system of the compressor-condenser-expander type, such as illustrated in Fig. 13 and wherein refrigerant is circulated by means of a compressor or pump 20 through a condenser 21 for extracting or dissipating heat from the refrigerant medium and thence to a freezer or evaporator 23 in which the refrigerant medium is expanded or vaporized for absorbing heat and the refrigerant medium is then returned to the compressor, from whence the cycle is repeated.

The compressor 20 as illustrated in the drawings, is shown as being enclosed within a gas-tight housing or casing indicated generally at 22 and an electric motor indicated generally at 24 is illustrated as being constructed integrally with the casing 22 and for operating the compressor. The motor 24 is of the alternating current type and is adapted to be supplied with electric energy through suitable conduits 25 connected to the motor windings indicated generally at 26, and which are arranged externally of the casing 22. Current may be supplied intermittently to the motor for operating the same at intermittent periods and the supply of current to the motor may be under the control of a switch 27, which is operatively associated with the evaporator or freezer element 23 of the refrigerating system so that the compressor will be operated in such a way as to maintain the temperature of the evaporator within certain predetermined temperature limits. While the motor compressor unit herein contemplated is particularly suited for use in refrigerating systems and especially refrigerating systems for household refrigerators, the motor compressor unit is adapted for use generally wherever it is desired to seal or protect the motor windings from conditions obtaining in the field of activity with which the motor may be used.

In the construction as illustrated in Fig. 1 the compressor 20 is arranged within the gas-tight casing 22 and refrigerant from the evaporator is supplied to the compressor 20 through a suitable conduit. The refrigerant is discharged from the compressor 20 into the interior of the casing 22 and the refrigerant is conducted by means of a suitable conduit to the condenser 21. The casing 22 functions as a lubricant reservoir and the lubricant therein is subject to the discharge pressure of the compressor. As the refrigerant medium is supplied to the evaporator element 23 under the control of a suitable regulating means, such as a valve, the space within the casing 22 and the condenser 21 are on the high pressure side of the refrigerating system.

The lubricant is provided for lubricating the working parts of the system such as the moving parts of the compressor 20 and some of this lubricant will circulate with the refrigerant throughout the system; however, a body of lubricant will collect within the casing 22 and to such an extent as to submerge the compressor 20 therein. As the lubricant is subjected to the discharge pressure of the pump and as the pump is submerged in lubricant, the pump will be lubricated. The details of the compressor are not illustrated herein, but the compressor may be of the rotary type, such as that disclosed in the patent to John C. Buchanan No. 2,028,824 issued January 28, 1936 for Compressor for refrigerating systems and the lubrication of the pump or compressor may be effected as disclosed in such patent; that is, by arranging the compressor within a body of lubricant and subjecting such lubricant to the discharge pressure of the compressor.

The motor 24 includes a rotor 28 and a stator 30 including the motor windings 26. The stator comprises a ring or annular section which forms a part of the casing 22 and is disposed between a pair of end bells or caps 32 and 34. The caps 32 and 34 and the stator 30 are secured together by means of a bolt or shaft 36 which extends axially through the parts and which has nuts 38 threadedly secured to the ends thereof for rigidly securing the parts of the casing together. The bolt 36 forms an axle or bearing upon which the rotor 28 is journaled. The rotor 28 includes an elongated sleeve 40 which is journaled on the shaft 36 and which sleeve 40 has integrally formed therewith or connected thereto an eccentric element 42. The eccentric element 42 is adapted to form a part of the compressor 20, which is illustrated as being of the rotary type such as that disclosed in the Buchanan patent heretofore referred to.

The rotor 28 may be of conventional construction and comprise a stack of circular laminations 44 secured together such as by means of a plurality of rivets 46 and press fitted upon the sleeve 40. The rotor 28 may be provided with a plurality of axially extending bores 48 so as to permit the free passage of the refrigerant medium from one side to the other side thereof as the connection between the casing 22 and the condenser 21 preferably communicates with the part of the casing above the rotor 28.

The stator 30 as illustrated in Figs. 1 to 7 inclusive, comprises a spider section 50 surrounded by a ring or annular section 52. The spider section 50 comprises a stack of laminations 54 (Fig. 4) and a pair of end or locating rings 56, the spider laminations being made out of iron or any other suitable magnetic material. Each of the spider laminations 54, it will be observed, includes an annular connecting portion 58 at the inner periphery thereof and a series of radially extending arms 60 providing slots 61 for accommodating the motor windings.

The spider section 50, which in fact is a ring or annular section, may be formed as follows:

A mould such as illustrated in Figs. 6 and 7 and comprising a mandrel 62, a pair of end caps 64 and a body member 66 is provided so that the outer diameter of the mandrel is just slightly less than the inner diameter of the spider laminations 54 and the body member 66 is provided with a form complementary to that of the spider laminations 54. The mould is assembled with the top end cap 64 removed and with one end ring 56 disposed in the bottom of the mould. All of the spider laminations 54 are dipped separately in a plastic or sealing material in a liquid state and then such laminations are assembled over the mandrel 62 so that they will occupy the position such as illustrated in Fig. 6. After all of the stator laminations have been assembled on the mandrel, the inserts 68 formed of plastic material are inserted in the bottom of the slots 61 formed by the spider arms 60 and as illustrated in section in Fig. 7. The top end ring 56 is then put over the mandrel and the top cap 64 of the mould is put in place. The mould is then subjected to heat and pressure so as to cure the plastic material and to cause the same to bond together the laminations 54 and the inserts 68. Such pressure as is necessary is applied to the stator in the mould so as to insure that the stator laminations and the plastic material are securely and intimately bonded together. Instead of making the inserts 68 separately, plastic material in a liquid state and under pressure may be fed into the mould in such a way as to fill up the bottom or inside of the slots formed by the arms of the spider laminations with plastic material to approximately the same extent as the inserts 68 fill the bottom of the slots formed by the spider arms. That is, instead of being formed separately the inserts 68 may be formed within the mould by applying plastic material thereto under pressure. After the stator has been subjected to sufficient heat and pressure for a proper length of time, the same may be removed from the mould.

The stator laminations 54 are stamped out so as to leave approximately .032" of stock in the connecting portion 58 thereof and this .032" of stock is further reduced in grinding down to .025" or less. The plastic material filling the bottom of the slots 61 between the spider arms 60 is of such an amount as to insure that the stator is sealed or made gas-tight across the portion at the bottom of the slots and this plastic material also provides a certain amount of structural strength to the whole stator ring.

The outer ring section 52 is formed of a stack of laminations 70. It is practical to stamp one of each of the stator and rotor laminations out of a single piece of material. The laminations of the outer ring 52 may be split so that they can be pressed into a clamping band 78, with the inside diameter of the laminations of the outer ring 52 reduced to a point where they can be ground to fit over the outside diameter of the laminations of the inner ring 50, or the outside diameter of the laminations of the inner ring 50 may be ground to a point where the inner ring will fit within the outer ring. After grinding the inside diameter of the outer ring 52, the same is press fitted over the inner ring 50 or vice versa, after the motor windings 26 have been assembled in the slots 61. After the inner and outer rings 50 and 52 have been assembled, a pair of fibre washers 80 are arranged between each of the end or locating rings 56 and the band 78 and the ends of the band 78 are then spun over the ends of the laminations 70 for holding the assembled parts in proper relationship. After the inner and outer rings 50 and 52 have been thus assembled the inside diameter of the inner ring 50 is ground to reduce the thickness of the stock of the connecting portions 58 down to .015" or less. The object of reducing the amount of metal at the bottom of the slots 61 or on the inside diameter of the inner ring 50 is for the purpose of reducing flux losses through such metal. It has been found that for a ⅛ H. P. motor, a thickness of .025" for the connecting portion 58 does not impair or materially affect the efficiency of the motor.

The motor windings 26 are wound upon the inner ring 50 after the same has been formed and outer ring 52 is subsequently assembled. The end rings 56 of the stator serve as locating rings to be used as a guide for the end supporting castings or caps 32 and 34. The rings 56 are bonded to the stator laminations and also are bonded to the end castings 32 and 34 by any suitable plastic material so as to insure a gas-tight joint capable of withstanding the pressures obtaining within the casing 22. As the motor windings 26 are arranged externally of the casing 22 and hence not exposed to the refrigerating medium and oil within the casing 22, such windings may be covered with enamel instead of the cotton covering employed when the windings are arranged inside of the casing, with the result that more enamel-covered wire may be employed in the windings than it is possible to use when employing a cotton-covered wire. This increases the capacity of the motor.

In the modification disclosed in Figs. 8 to 11 the parts are constructed in a somewhat different manner. The casing 122, as illustrated in Figs. 8 to 11 comprises a cup-shaped shell indicated generally at 124 and bearing block 126 fitted into the mouth of the shell and welded, or otherwise suitably secured thereto. The cup-shaped shell 124 comprises an end section 128, a stator section 130 and a lower cylindrical section 132. The end section 128 may comprise a generally circular end plate provided with a series of axially extending legs 134 and includes an annular wall 136 of plastic material, the legs 134 being embedded in the wall 136 of plastic material so as to increase the strength thereof. The lower section 132 may comprise an annular metallic ring 138 adapted to be arranged opposite bearing block 126 and having a series of upstanding arms 140 which are embedded in a wall 142 of plastic material, the arms 140 being provided for increasing the strength of the wall 142 of plastic material. The sections 128 and 132 preferably are formed in a mould so that the metallic portions thereof are bonded to the plastic material.

The rotor and the compressor of the modification illustrated in Fig. 8 may be identical to that illustrated in Figs. 1 to 4. In the various modifications illustrated throughout the several figures of the drawings, a thrust bearing (not shown) may be arranged between the bottom end of the sleeve upon which the motor rotor is carried and the bearing block which forms the bottom wall of the casing, for taking the thrust of the motor.

The bearing block 126 is provided with an upstanding axle shaft 144 and this shaft may extend through an opening in the section 128 into a recess formed therein and have connected to a threaded end of the shaft 144 a nut 146 for assisting in holding the parts of the casing in assembled relationship. A suction line 148 connecting with the evaporator 23 may be connected to an opening in the bearing block 126 and a liquid line 149 connecting with the condenser 21 may be connected to an opening in the top element 128.

In Fig. 8, it will be observed that the wall section of the casing 122 opposite the motor windings 126' is formed of plastic material except for the metallic reinforcements which may be of brass. The utilization of a wall section opposite the motor windings constructed of non-metallic material prevents flux loss through the casing 122.

As illustrated in Fig. 12, the cylindrical walls of the casing 222 opposite the motor windings may be constructed entirely of a plastic or non-metallic material. In this instance there would be provided between the stator 230 and the metallic end sections 228 and 232 rings of plastic material 234 and 236 bonded to each of these parts so as to provide a gas-tight casing.

The construction of the stators 130 and 230 is like that of the stator 30 except that the outer ring 152 of stator 130 is formed with a series of radially inwardly extending fingers 153 so that the motor windings are arranged upon the outer ring 152 by inner winding instead of by external winding as is the case in the construction illustrated in Fig. 1. The inner ring 150 of the construction illustrated in Fig. 8 may be formed like the ring 50 except that the arms 160 are relatively short and extend outwardly only, far enough to provide slots or recesses 163 for reception of the plastic material 168. The slots 161 formed between the arms 153 of the outer ring 152 in this instance are only of a depth sufficient to accommodate the windings 126.

In the construction illustrated in Fig. 8 the outer ring 152 may be formed by assembling a stack of laminations and securing the same together such as by a plurality of rivets 155. The inner ring 150 may be formed in a manner similar to that in which the inner ring 50 is formed. After the windings 126 have been inserted in the slots 161, the outer ring 152 is pressed upon the inner ring 150. The inside diameter of the inner ring 150 is then ground so as to reduce the width of the connecting portions 158 at the bottom of the slots to the desired thickness, preferably to .015" or less. The stator is then assembled with the upper and lower sections 124 and 128 and the parts are all bonded together so as to form a gas-tight casing.

After the casing 122, including the stator and motor windings, is formed, the bearing block 126, the compressor and the rotor may be assembled within the casing 122 and the casing 122 welded or otherwise secured to the bearing block 126. Subsequently the nut 146 may be applied to the end of the shaft 144.

Examples of non-conducting materials or plastic compounds which may be used in the sealed motor construction herein set forth are glass, phenolic moulding compounds and inorganic cold moulded compounds. The non-conducting material, in order to be satisfactory must be capable of withstanding, without deformation, temperatures of 250° to 300° F. and must be resistant to lubricating oil and sulphur dioxide or any other refrigerant medium which might be used in the refrigerating system. Reference herein to glass or a plastic compound shall include any electrical non-conducting material; that is, material which is ordinarily considered to be a non-conductor of electricity. Such material, in addition to being a non-conductor of electricity also ordinarily is non-magnetic.

My copending application Ser. No. 119,568, filed January 8, 1937, for Electric motors and method of making the same, claims certain broad features of the construction, as well as certain features of the method of construction herein disclosed.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. A sealed motor having in combination a stator comprising a stack of annular laminations secured together and forming a gas-tight ring, said laminations being formed of a magnetic material, motor windings arranged externally of said ring, portions of the metal walls of said ring opposite said motor windings being reduced in thickness relative to the remaining portions of the metal walls of said ring, an insert of non-conducting material disposed between said ring and said motor windings and secured to said ring so as to form an integral part thereof, means cooperating with said ring to provide in conjunction therewith a gas-tight casing, means operatively associated with said motor windings and the laminations of said ring to provide a metallic path for the magnetic field of said windings and a rotor arranged and sealed within said casing.

2. In a sealed motor construction a stator including inner and outer rings arranged to provide an annular series of slots therebetween, each of said rings comprising a stack of annular laminations constructed of magnetic material, motor windings arranged in said slots, means cooperating with said inner ring to provide in conjunction therewith a sealed casing with said windings disposed externally thereof, a motor rotor arranged within said casing, those portions of said inner ring disposed between said rotor and said windings including thin sections of magnetic material, said sections being of such thickness that the flow of flux thereacross does not substantially affect the efficiency of said motor, and a reinforcement of non-conducting material secured to the outside of said thin sections so as to form an integral part of said inner ring.

3. In a sealed motor a stator including inner and outer rings arranged to provide an annular series of slots therebetween, each of said rings comprising a stack of annular laminations formed of magnetic material, motor windings arranged in said slots, said inner ring constituting an integral section of a sealed casing and said motor windings being arranged outwardly of said casing, a motor rotor arranged within said sealed casing, those portions of said inner ring bridging said motor winding slots including a section of magnetic material of the order of .025" thick and a body of non-conducting material secured externally to each of said sections in such a way as to form an integral part of said inner ring.

4. In a sealed motor a stator including inner and outer rings arranged to provide an annular series of slots therebetween, each of said rings comprising a stack of annular laminations formed of magnetic material, motor windings arranged in said slots, said inner ring constituting an integral section of a sealed casing and said motor windings being arranged externally of said casing, a motor rotor arranged within said sealed casing, each of those portions of said inner ring bridging said motor winding slots including a section of magnetic material of a dimension materially less than the dimension of the magnetic material between each of said slots, and a body of non-conducting material intimately secured to each of said sections.

5. In a sealed motor a stator including a ring arranged to provide an annular series of slots therein, said ring comprising a stack of annular laminations formed of magnetic material, motor windings arranged in said slots, a motor rotor arranged within said ring, those portions of the inner periphery of said ring including a restricted section of magnetic material arranged between said rotor and said slots, said inner periphery of said ring constituting an integral part of a gas-tight casing which incloses said rotor and having said motor windings arranged externally thereof and a plastic body secured to each of said sections externally thereof.

6. In a sealed motor a stator comprising inner and outer rings, each of said rings comprising a stack of annular laminations formed of magnetic material, one of said rings constituting a spider and including an annular series of radially extending arms and the other of said rings being telescopically arranged relative to said one of said rings so that said arms define an annular series of slots, the inner one of said rings constituting a section of a gas-tight casing, a motor rotor arranged within said casing, motor windings arranged in said slots and disposed externally of said casing, those portions of the inner one of said rings arranged between said slots and said rotor including a section of magnetic material which is of a substantially less dimension than the dimension of the arms of said spider, and a plastic body member disposed between each of said sections and said motor windings.

7. In a sealed motor a stator comprising inner and outer rings, each of said rings comprising a stack of annular laminations formed of magnetic material, one of said rings constituting a spider and including an annular series of radially extending arms and the other of said rings being telescopically arranged relative to said one of said rings so that said arms define an annular series of slots, the inner one of said rings constituting a section of a gas-tight casing, a motor rotor arranged within said casing, motor windings arranged in said slots and disposed externally of said casing, those portions of the inner one of said rings arranged between said slots and said rotor including a section of magnetic material which is of a substantially less dimension than the dimension of the arms of said spider, and a plastic body member disposed between each of said sections and said motor windings.

8. Sealed motor construction comprising a gas-tight casing having a motor rotor arranged therein, said casing including an integral section comprising a stack of annular laminations arranged opposite said rotor, said section constituting a part of a laminated stator ring which includes an annular series of slots arranged externally of said casing, motor windings arranged in said slots, said section including relatively thin wall portions of magnetic material disposed between each of said slots and said rotor and which are of such thickness that the flux flow thereacross does not substantially affect the efficiency of said motor, and a body of plastic material bonded to each of said thin wall portions.

9. Sealed motor construction comprising inner and outer rings, each of said rings comprising a stack of laminations formed of magnetic material, said inner ring having an annular series of radially extending projections and the radial thickness of said ring between said projections being of less dimension than the width of said projections, a body of plastic material disposed in each of the spaces between said projections and secured to said ring, an annular series of slots disposed between said inner and outer rings and opposite said plastic material, motor windings arranged in said slots, said inner ring constituting a part of a gas-tight casing, a motor rotor arranged within said gas-tight casing.

10. Sealed motor construction comprising inner and outer rings arranged to provide therebetween an annular series of slots, said outer ring comprising a stack of laminations formed of magnetic material, said inner ring comprising a stack of annular laminations formed of magnetic material and having a smooth and continuous inner periphery defined by said laminations, said inner ring including relatively thin wall portions of magnetic material reinforced by bodies of plastic material, said inner ring constituting a part of a gas-tight casing, a motor rotor arranged within said casing and motor windings arranged in slots and disposed externally of said casing.

11. A sealed motor having in combination a stator comprising a stack of annular laminations secured together and forming a gas-tight ring, said laminations being formed of a magnetic material, motor windings arranged externally of said ring and projecting therebeyond, portions of the magnetic material of the walls of said ring opposite said motor windings being reduced in thickness relative to the remaining portions of the metal walls of said ring, means including walls formed of plastic material bonded to said ring and adapted to provide in conjunction therewith a gas-tight casing, said stator including an outer ring comprising a stack of laminations secured together and disposed outwardly of said motor windings and a rotor arranged and secured within said casing.

EARL F. HUBACKER.